United States Patent
Lindner et al.

[11] Patent Number: 5,681,081
[45] Date of Patent: Oct. 28, 1997

[54] VEHICLE SEAT

[75] Inventors: Fritz Lindner, Stromberg; Georgios Tsilchorozidis, Stuttgart, both of Germany

[73] Assignee: Mercedes-Benz AG, Stuttgart, Germany

[21] Appl. No.: 738,593

[22] Filed: Oct. 29, 1996

[30] Foreign Application Priority Data

Oct. 30, 1995 [DE] Germany .......................... 195 40 395.9

[51] Int. Cl.⁶ .................................................. B60R 22/28
[52] U.S. Cl. ................. 297/216.13; 297/483; 297/378.13; 297/216.14; 296/68.1; 280/808
[58] Field of Search ................. 297/216.13, 216.14, 297/378.11, 378.13, 483, 484; 296/68.1; 280/808, 748

[56] References Cited

U.S. PATENT DOCUMENTS

| 2,815,796 | 12/1957 | Lobanoff | 297/378.13 X |
| 3,788,685 | 1/1974 | Lerchtl | 297/378.13 X |
| 5,390,977 | 2/1995 | Miller | 296/68.1 X |

FOREIGN PATENT DOCUMENTS

| 2923550A1 | 1/1981 | Germany . | |
| 4427835A1 | 2/1996 | Germany . | |
| 4435835A1 | 4/1996 | Germany . | |
| 3243446 | 10/1991 | Japan | 280/808 |

*Primary Examiner*—Peter R. Brown
*Attorney, Agent, or Firm*—Evenson McKeown Edwards & Lenahan PLLC

[57] ABSTRACT

A seat for vehicles is provided with a pivotable seat back and a seat belt system including a seat belt, a belt roll-up device, and a belt deflector mounted on the seat back. A locking device triggerable in the event of a collision is provided for securing the seat back to the vehicle body. To create a highly stable locking device without having parts projecting therefrom when the seat back is folded, the locking device has a locking pin that is displaceable crosswise with respect to the vehicle, the pin cooperating with a hole located in the side wall of the body and urged by a tensioned drive spring in the direction of the hole, and a locking unit which secures the locking pin in its basic position against axial displacement. The locking unit is coupled to a section of the seat belt located between the belt roll-up device and the belt deflector in such fashion that it releases the locking pin as a result of a pull that acts when the belt pull-out lock on the seat belt is active.

20 Claims, 4 Drawing Sheets

VEHICLE SEAT

BACKGROUND AND SUMMARY OF THE INVENTION

The invention relates to a seat for vehicles, especially automobiles, of the type including a seat cushion, a seat back pivotally mounted on the seat cushion for folding movement, a passenger restraining seat belt system, and a seat back locking system operable in dependence on the seat belt system operation.

In a known seat of this type (German Patent Document DE 29 23 550 A1) the locking device has a transfer lever and a locking lever, each of which is mounted non-rotatably by one lever end on a pivot axis that is rotatably mounted in the seat back and extends in the transverse direction of the vehicle. At the other lever end of the transfer lever, a seat belt deflector is mounted extending at right angles from said lever, and the other lever end of the locking lever has a locking pin which can enter a locking hole in a locking track mounted on the side wall of the body. A retaining spring that engages the locking lever normally pivots the locking lever away from the locking track and thus prevents the locking pin from dropping into the locking hole. In a collision, the transfer lever is pivoted forward by the tension of the belt against the belt deflector, so that the locking lever is pivoted upward against the restoring force of the retaining spring on the pivot axis, and the locking pin drops into the locking hole. As a result, the restraining forces of the belt are conducted directly into the vehicle body, and excessive stress on the seat back frame does not develop. In order to ensure the function of the locking device even in different positions of the seat back when inclined at an angle to the vertical, a plurality of locking holes is arranged sequentially in the locking track, with one locking hole being associated with each of the angle adjustment positions for the seat back.

When such seats are used as rear seats, in station wagons for example, the seat backs are made to fold so that when the rear seats are not occupied, by folding the seat back onto the seat cushion and possibly by folding the seat cushion against the back of the front seat, the size of the cargo bay of the vehicle can be increased. In the case of front seats of two-door vehicles, the seat backs are likewise mounted so they can fold onto the seat cushions of the front seats in order to provide access to the rear seats after the seat backs have been folded forward. In such folding seat backs, the lever handle of the locking device projecting laterally from the seat back with its transversely extending locking pin would not only collide with the side panel of the body, the arm rest on the door, etc. but also could cause injury if handled negligently by the passenger.

An object of the invention, in a seat of the type referred to above is to improve the locking device that operates in a collision in such fashion that firstly a reliable guidance of the belt forces into the vehicle body in the event of a collision is ensured, and secondly unimpeded folding of the seat back is ensured without the risk of injury to the operator when the seat is unoccupied.

This object is achieved in preferred embodiments of the invention by providing an arrangement with an axially displaceable locking pin in the seat back which is selectively released in dependence on the forces on the seat belt to thereby lockingly engage in an opening in an adjacent vehicle side body part.

The seat according to the invention has the advantage that the entire locking device is integrated into the seat back and is activated only upon the actuation of the locking device in the event of a collision or during extremely hard braking, in other words, when the seat belt system for restraining the vehicle occupant is activated by exceeding a certain value of vehicle deceleration. The locking pin then projects further from the seat back and a highly stable collision-proof connection of the seat back to the vehicle body is achieved. The actuation of the locking device assumes that the seat is occupied and the seat belt has been put on by the vehicle occupant.

To prevent the seat back from folding over when the seat is unoccupied, an additional conventional lock can be provided between the seat back and the vehicle body which must be released manually when folding the seat back. Such a lock however can be made very easily and economically, since in the event of a collision it must accept only slight forces that depend on the weight of the seat back.

Other objects, advantages and novel features of the present invention will become apparent from the following detailed description of the invention when considered in conjunction with the accompanying drawings.

DETAILED DESCRIPTION OF THE INVENTION

Figure 1:
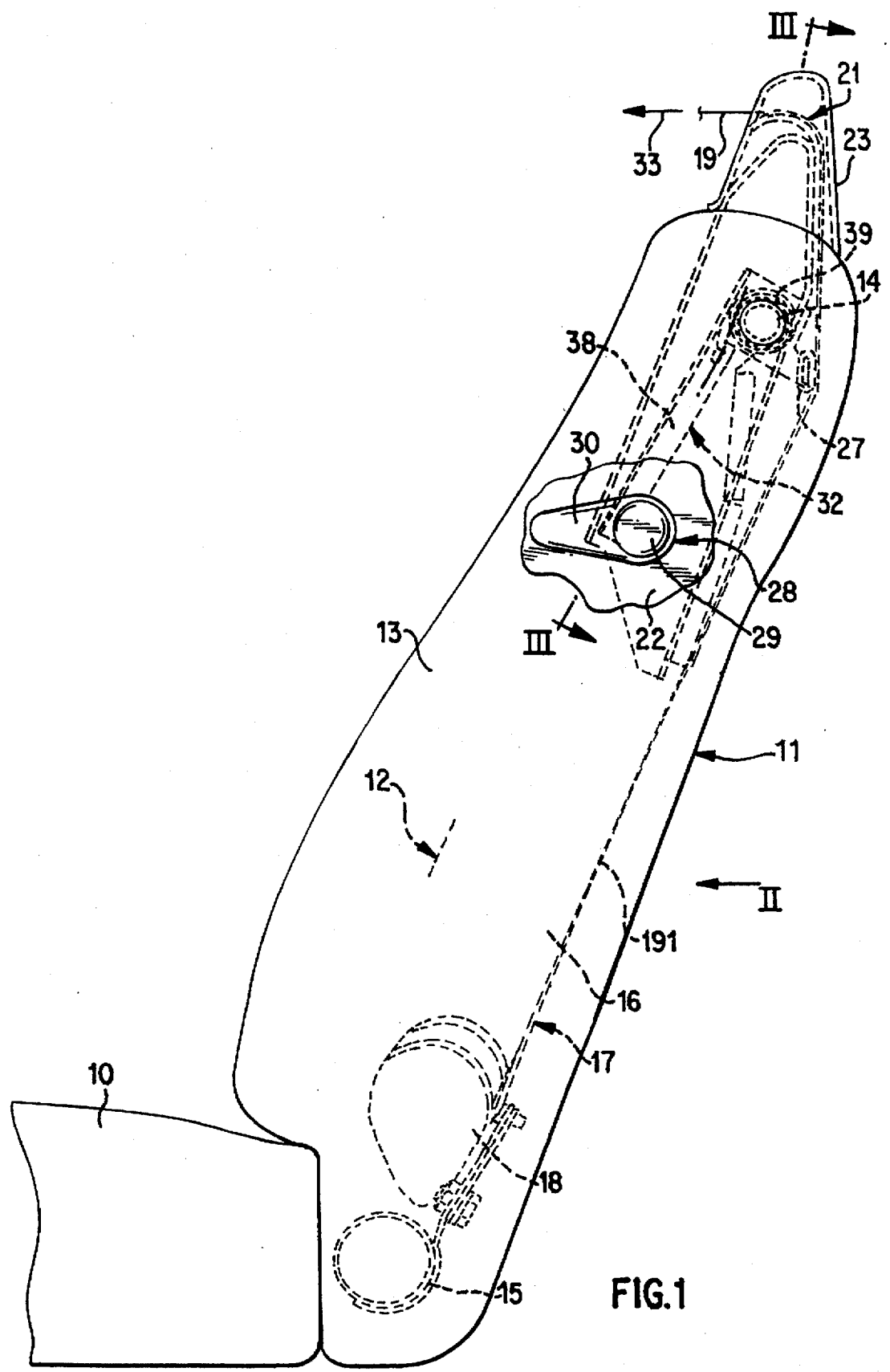
FIG. 1 is a schematic side view of a seat assembly for an automobile constructed according to a preferred embodiment of the invention.

The vehicle seat for an automobile shown in section in a side view in FIG. 1 in known fashion has a seat cushion 10 and a back 11 which, as is not shown here in greater detail, is mounted on seat cushion 10 to pivot around a pivot axis that extends transversely with respect to the vehicle and is foldable at its front onto the surface of the seat cushion. Seat back 11 has a seat back frame 12 and a seat back cushion 13 that rests on an inner spring mounted inside seat back frame 12 (not shown here) and is covered by a cushion that also conceals the back of seat back frame 12. Seat back frame 12 consists of an upper cross tube 14, a lower cross tube 15, and two side pillars 16 that connect the two cross tubes 14, 15 with one another, with only the left side pillar 16 being shown in the figures in the drawing.

The vehicle seat has associated with it a seat belt system 17 for restraining a vehicle occupant sitting on the seat, said system in known fashion having a belt roll-up mechanism with a belt pull-out lock that acts in the event of a collision, the so-called retractor 18, a seat belt 19 that can be pulled out of retractor 18, and a buckle, not shown here, that is anchored to the vehicle floor and into which in known fashion a lock tongue mounted on seat belt 19 is inserted after the vehicle occupant puts on seat belt 19. Retractor 18 is fastened by a tab 20 to bottom cross tube 15 of seat back frame 12, and seat belt 19 is pulled out of retractor 18 and guided over a belt deflector 21 attached to seat back 12 above the shoulder of the vehicle occupant, and runs from there across the chest of the vehicle occupant.

Figure 2:
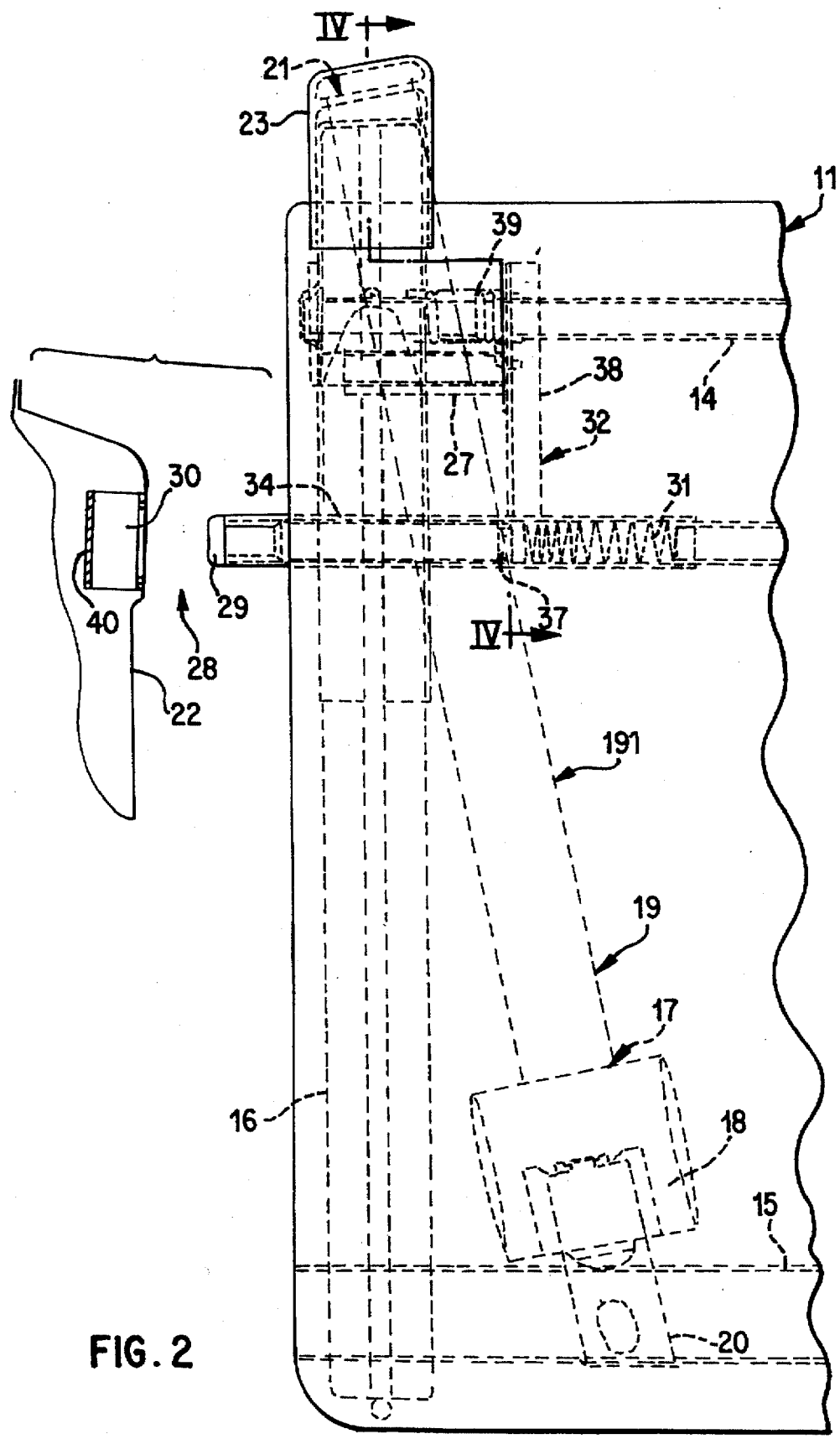
FIG. 2 shows portions of a view of the seat looking in the direction of arrow II in FIG. 1.
Figure 4:
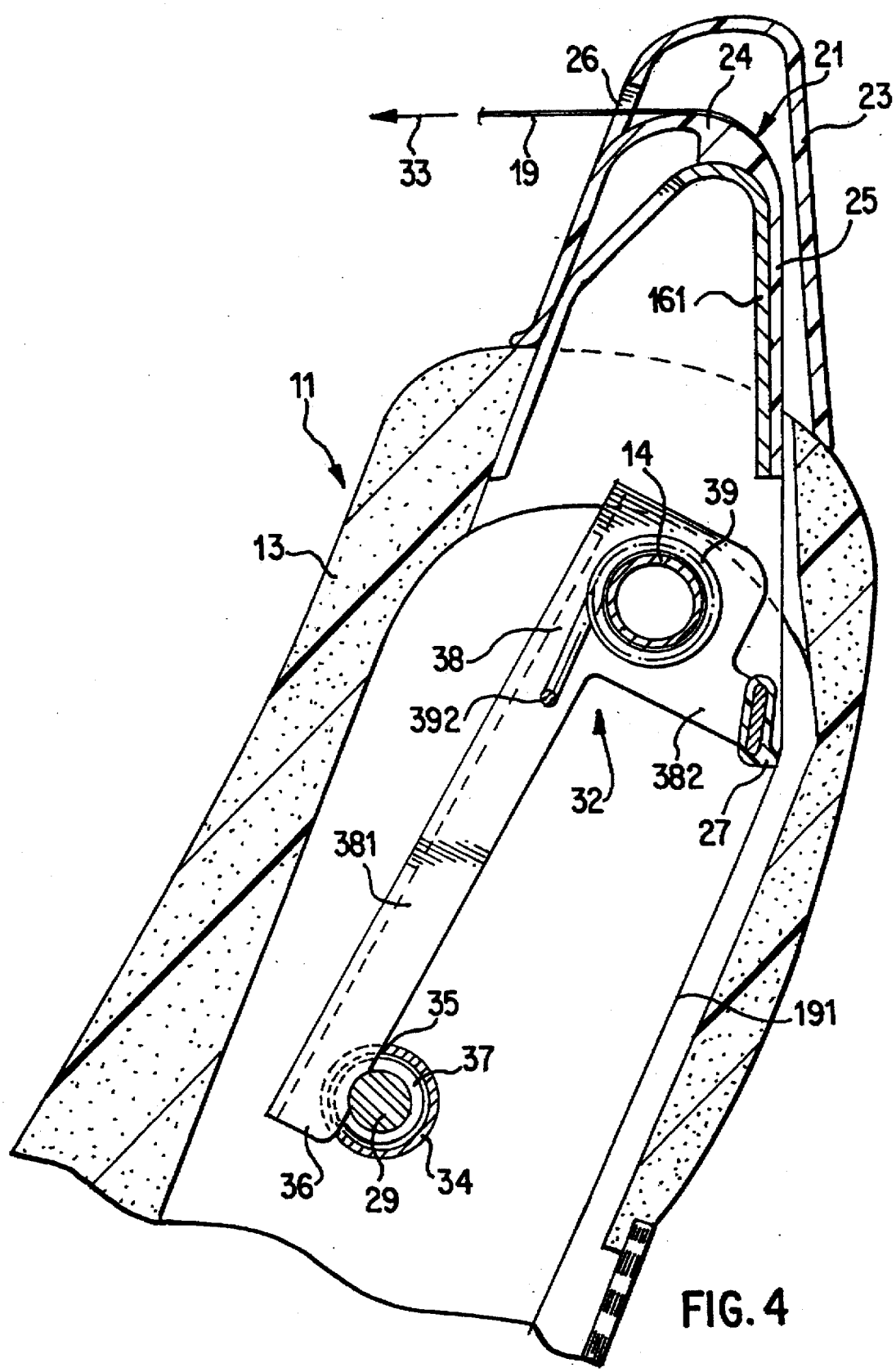
FIG. 4 is a section along line IV—IV in FIG. 2.

To form belt deflector 21, side pillar 16 of seat back frame 12 which is next to the body side wall indicated by 22 in FIGS. 1 and 2, in this case left side pillar 16, projects beyond the upper edge of seat back cushion 13 and has on its extension 161 a cap 23 that extends up to seat back cushion 13, in which belt deflector 21 is formed as a cross rib 24. As can be seen most clearly in FIG. 4, seat belt 19 coming from retractor 18 runs from below into cap 23, rests on a guide surface 25 formed in cap 23 that abuts the back of extension 161 of side pillar 16, and passes through an opening 26 provided in the front of cap 23 to the front of seat back 11. Seat belt 19, before entering cap is guided over a sliding section 27 of a locking device 28 that will be described in greater detail below, with sliding section 27 being arranged so that the part 191 of seat belt 16 that extends between retractor 18 and belt deflector 21 is bent at an obtuse angle in the vicinity of sliding section 27, in other words, the part of belt section 191 that extends from retractor 18 to sliding section 27 forms, with the part of belt section 191 that extends from sliding section 27 to belt deflector 21, an obtuse angle in which sliding section 27 is located.

Locking device 28 serves, in the event of a vehicle accident or during an especially hard brake application, in other words when the belt pull-out lock in retractor 18 of seat belt system 17 is operative and the vehicle occupant is restrained in the seat by seat belt 19, to secure seat back 11 to the vehicle body and thus to conduct the restraining forces of seat belt system 17 that act on seat back 12 directly into the vehicle body. For this purpose, locking device 28 has a locking pin 29 which is displaceable axially in seat back 12 in the transverse direction with respect to body side wall 22, a hole located in body side wall 22 (FIGS. 1 and 2) for receiving the free end of locking pin 29, a drive spring 31 that urges locking pin 29, said spring pushing locking pin 29 in the direction of hole 30 when released, and a locking unit 32 that secures locking pin 29 in its basic position when drive spring 31 is tensioned, in which position locking pin 29 is out of engagement with hole 30. Locking unit 32 is coupled to belt section 191 of seat belt 19 that runs between retractor 18 and belt deflector 21 in seat back 12 in such fashion that when the belt pull-out lock on retractor 18 is operative as a result of a pull 33 acting on seat belt 19 (FIGS. 1 and 4), locking pin 29 is released so that it can be displaced axially by drive spring 31 and enter hole 30.

Figure 3:
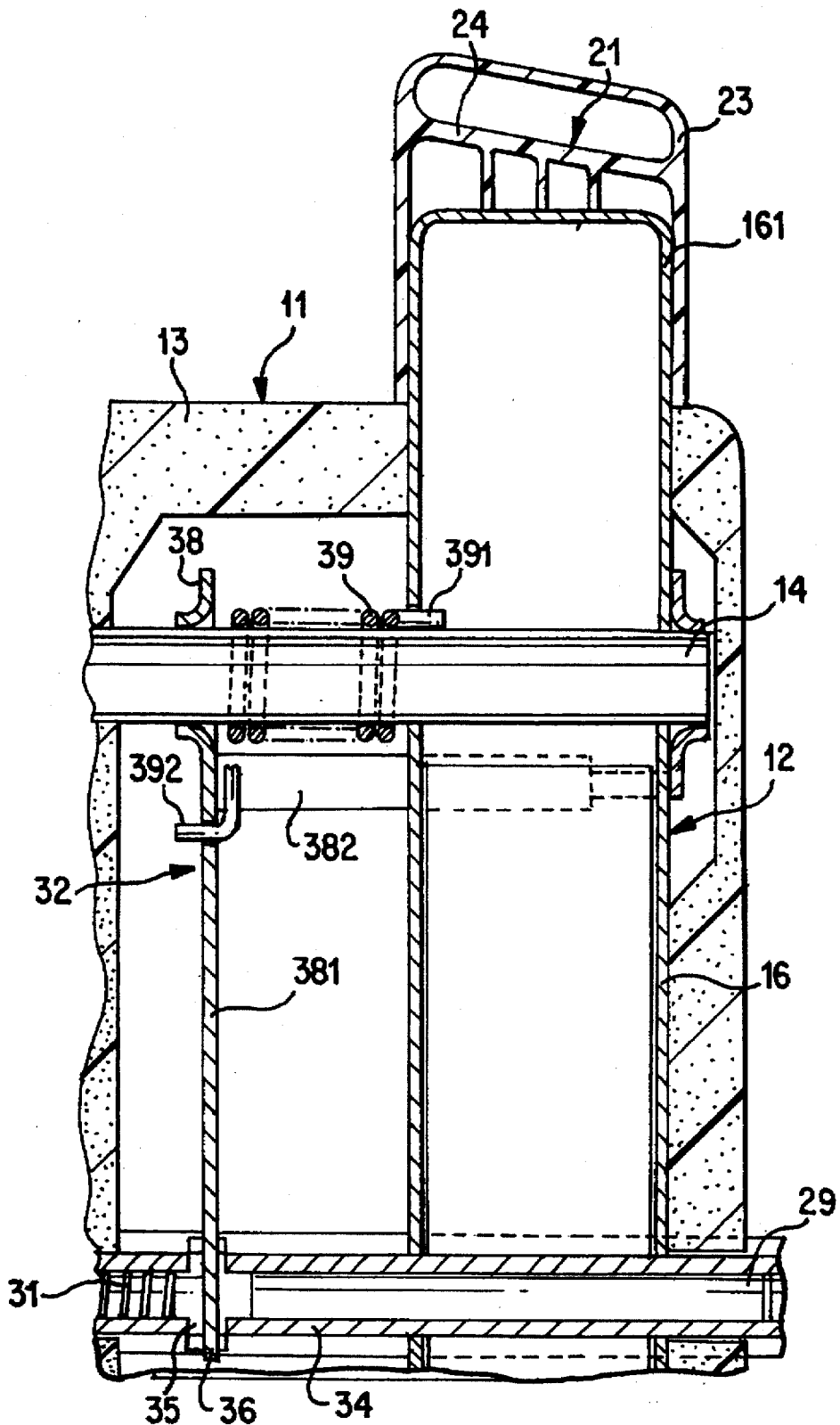
FIG. 3 is a section along line III—III in FIG. 1.

As is evident from FIGS. 2 and 3, locking pin 29 is guided axially displaceably in a guide sleeve 34 fastened in seat back 11, specifically in left side pillar 16 of vehicle frame 12. Drive spring 31 is designed as a compression spring that fits in guide sleeve 34 and at one end abuts one end of locking pin 29 and at the other end abuts guide sleeve 34. Guide sleeve 34 has a recess 35 that extends over a portion of its circumference, the axial width of said recess being slightly larger than the thickness of a locking member 36 of locking unit 32 so that locking member 36 can pass through recess 35 into the interior of guide sleeve 34. On locking pin 29, at a short distance from its end urged by drive spring 31, a circumferential locking groove 37 is provided whose axial width is likewise slightly larger than the thickness of locking member 36. Recess 35 and locking groove 37 are arranged relative to one another in space such that in the basic position of locking pin 29 in which the pin urged by drive spring 31 is free of hole 30 in body side wall 22, they lie in the same cross-sectional plane as locking pin 26 and guide sleeve 34, so that locking member 36 of locking unit 32 can fall through recess 35 into locking groove 37 and can secure locking pin 29 in its basic position against axial displacement.

The locking unit 32 which is coupled to seat belt 19 to be triggered has an angle lever 38 with a long leg 381 and a short leg 382 extending therefrom at right angles. Angle lever 38 is rotatably mounted on upper cross tube 14 of seat back frame 12. A torsion spring 39 slid onto cross tube 14 has one leg 391 abutting side pillar 16 and the other leg 392 abutting long leg 381 of angle lever 38. Long leg 381 has on its free end, locking member 36 that is preferably formed on the end of long leg 381 itself, and the spring pretensioning of torsion spring 39 is directed so that it urges angle lever 38 in a rotational direction in which locking member 36 is pushed into locking groove 37 in locking pin 29. The short leg 382 of angle lever 38 on one end has the sliding section 27 already mentioned which, with locking pin 29 secured by locking unit 32 in its basic position, pushes against belt section 191 of seat belt 19 in such fashion that the obtuse angle described above is formed in belt section 191. As can be seen from FIG. 2, the width of sliding section 27 (looking in the direction crosswise of the seat back) is made larger than the width of seat belt 19 so that the latter rests securely on sliding section 27. The pretensioning of torsion spring 39 is designed so that with a normal pull 33 on seat belt 19, as occurs when seat belt 19 is normally pulled out of retractor 18 when seat belt 19 is put on, the reaction force exerted by belt section 191 on sliding section 27 cannot rotate angle lever 38. It is only when seat belt system 17 responds to an extremely strong deceleration of the vehicle, in other words, when the belt pull-out lock in retractor 18 is operative and hence pull 33 on seat belt 19 exceeds a certain value (4000N for example), that the reaction force exerted by seat belt 19 on sliding section 27 can overcome the spring force of torsion spring 39 and angle lever 38 is pivoted against the pretensioning of torsion spring 39 (clockwise in FIG. 1) so that locking member 36 at the end of long leg 381 is lifted out of locking groove 37 of locking pin 29. Locking pin 29 which is now free is pushed outward by the force of expanding compression spring 31 in guide sleeve 34 and enters hole 30 in body side wall 22. The displacement travel of locking pin 29 is limited by stop 40 located at the bottom of hole 30. As a result, seat frame 12, and especially side pillar 16 that supports belt deflector 21, is connected in a highly stable fashion with body side wall 22, and the retaining forces conducted by seat belt 19 through belt deflector 21 into the side pillar are conducted directly into the vehicle body.

The unlocking of seat back 12 and body side wall 22 is performed manually, for which purpose locking pin 29 is pushed back into guide sleeve 34 until locking member 36 tensioned by torsion spring 39, which abuts in recess 35 in guide sleeve 34 into an at the circumference of locking pin 29, snaps into locking groove 37.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A seat mounted in a vehicle, especially an automobile, with a seat cushion and a seat back pivotably mounted thereon, said seat back preferably being foldable onto the seat cushion, with a seat belt system for restraining a passenger sitting on the seat, said seat belt system comprising:

a belt roll-up device mounted on the seat back with a belt pull out retractor lock, a seat belt, a belt deflector mounted on the seat back, over which deflector the belt pulled out of the belt roll-up device is guided, and a locking device that can be triggered by the seat belt to secure the seat back to the vehicle body, wherein the locking device includes:

a locking pin that is axially displaceable in the seat back in a transverse direction between a locking position and a release position, a hole located in an adjacent body side wall of the vehicle to receive the free end of the locking pin, a drive spring that urges the locking pin in the direction of the hole toward the locking position, said spring being tensioned when the locking pin is in the release position in which the hole is released, and a locking unit that secures the locking pin in its basic position against axial displacement, said locking unit being coupled to a belt section of the belt that extends between the belt roll-up device and the belt deflector such that the locking pin is released as a result of pulling forces acting on the seat belt when the belt pull-out lock operates.

2. Seat according to claim 1, wherein the locking pin is axially displaceably guided in a guide sleeve held in the seat back and extending to at least a side of the seat back, wherein the drive spring is designed as a compression spring pushed into the guide sleeve, said spring abutting one end of the locking pin at one end and the guide sleeve at the other end, wherein the guide sleeve has a recess that extends over a partial circumference to allow a locking member of the locking unit to pass through, and wherein the locking pin has a circumferential locking groove selectively engageable with the locking member, and wherein the recess is located in the guide sleeve and the locking groove is located in the locking pin such that when the locking pin is in the basic position, the recess and locking groove are disposed in the same cross-sectional plane that is at right angles to the axes of the guide sleeve and the locking pin.

3. Seat according to claim 1, wherein the locking unit includes:

an angle lever mounted pivotably around a pivot axis parallel to the locking pin, with a long leg of said lever supporting the locking member and the other, short leg having a sliding section that abuts the seat belt, and a locking spring that urges the angle lever in such fashion that the locking member enters the locking groove, and wherein the angle lever is arranged relative to the seat belt in such fashion that when the locking member engages the locking groove, the sliding section that abuts the seat belt forms an obtuse angle with the belt section that extends between the belt roll-up device and the belt deflector, with the obtuse angle being formed at the sliding section.

4. Seat according to claim 3, wherein the seat back has a seat back frame with lower and upper cross tubes and two side pillars connecting the cross tubes with one another, as jell as a seat back cushion that covers the seat back frame, and wherein the side pillar which is next to the body side wall projects beyond an upper edge of the seat back cushion and has on its extension a cap that extends up to the seat back cushion, in which cap a cross rib that forms the belt deflector is formed.

5. Seat according to claim 4, wherein a guide surface formed in the cap for the seat belt abuts the back of the extension of the side pillar, and wherein an opening for the seat belt is located in the front of the cap that faces the front of the seat back.

6. Seat according to claim 5, wherein the angle lever is located next to the side pillar that supports the belt deflector and is rotatable on the upper cross tube, wherein the locking spring is designed as a torsion spring that rests on the user cross tube, said locking spring abutting the side pillar at one end and the long leg of the angle lever at the other end, and wherein the sliding section mounted on the short leg of the angle lever has a length greater than the width of the seat belt.

7. Seat according to claim 6, wherein the spring pretension of the torsion spring is set so that the spring force holding the locking member in the locking groove of the locking pin is slightly less than the minimum reaction force of the seat belt acting on the sliding section in the pivoting direction of the angle lever, said force being produce by extreme vehicle deceleration when the belt pull-out lock in the belt roll-up device is actuated.

8. Seat according to claim 7, wherein the belt roll-up device is mounted on the lower cross tube of the seat back frame.

9. Seat according to claim 8, wherein a stop that limits the displacement travel of the locking pin is located in the bottom of the hole.

10. Seat according to claim 5, wherein the belt roll-up device is mounted on the lower cross tube of the seat back frame.

11. Seat according to claim 4, wherein the angle lever is located next to the side pillar that supports the belt deflector and is rotatable on the upper cross tube, wherein the locking spring is designed as a torsion spring that rests on the upper cross tube, said locking spring abutting the side pillar at one end and the long leg of the angle lever at the other end, and wherein the sliding section mounted on the short leg of the angle lever has a length greater than the width of the seat belt.

12. Seat according to claim 11, wherein the spring pretension of the torsion spring is set so that the spring force holding the locking member in the locking groove of the locking pin is slightly less than the minimum reaction force of the seat belt acting on the sliding section in the pivoting direction of the angle lever, said force being produced by extreme vehicle deceleration when the belt pull-out lock in the belt roll-up device is actuated.

13. Seat according to claim 3, wherein the locking member is itself formed by a free end of the long leg of the angle lever.

14. Seat according to one of claim 1, wherein the seat back has a seat back frame with lower and upper cross tubes and two side pillars connecting the cross tubes with one another, as well as a seat back cushion that covers the seat back frame, and wherein the side pillar which is next to the body side wall projects beyond an upper edge of the seat back cushion and has on its extension a cap that extends up to the seat back cushion, in which cap a cross rib that forms the belt deflector is formed.

15. Seat according to claim 14, wherein a guide surface formed in the cap for the seat belt abuts the back of the extension of the side pillar, and wherein an opening for the seat belt is located in the front of the cap that faces the front of the seat back.

16. Seat according to claim 14, wherein the belt roll-up device is mounted on the lower cross tube of the seat back frame.

17. Seat according to claim 14, wherein a stop that limits the displacement travel of the locking pin is located in the bottom of the hole.

18. Seat according to claim 1, wherein a stop that limits the displacement travel of the locking pin is located in the bottom of the hole.

19. A seat back locking assembly which selectively locks a pivotal seat back to adjacent vehicle body structure comprising:

a locking pin axially slidably movable in a transverse direction of the vehicle and carried by the seat back, a locking detent opening disposed in the body structure of the vehicle and which is selectively lockingly engaged by the locking pin, and a locking pin actuation assembly engageable with a vehicle seat belt and operable to move the locking pin from a non-locking position to a locking position engaging said locking detent opening in response to tension forces on the seat belt above a predetermined value.

20. A seat back locking assembly according to claim 19, comprising a spring acting on the locking pin in a direction toward the locking position, wherein the locking pin actuation assembly includes relatively movable interengaging parts holding the locking pin in the non-locking position.

* * * * *